United States Patent [19]

Sugano et al.

[11] Patent Number: 4,462,280
[45] Date of Patent: Jul. 31, 1984

[54] MANUAL VALVE FOR HYDRAULIC CONTROL SYSTEM FOR AUTOMATIC TRANSMISSION

[75] Inventors: Kazuhiko Sugano; Kunio Ohtsuka, both of Yokohama, Japan

[73] Assignee: Nissan Motor Co., Limited, Yokohama, Japan

[21] Appl. No.: 349,307

[22] Filed: Feb. 16, 1982

[30] Foreign Application Priority Data

Feb. 17, 1981 [JP] Japan ................................ 56-20826

[51] Int. Cl.³ ........................ B60K 41/08; B60K 41/12
[52] U.S. Cl. ........................................ 74/868; 74/867; 74/869
[58] Field of Search .......................... 74/867, 868, 869

[56] References Cited

U.S. PATENT DOCUMENTS 3,705,642 12/1972 Thompson ............................ 74/869
4,050,332 9/1977 Taga ..................................... 74/869
4,368,653 1/1983 Mizuno et al. ....................... 74/869
4,391,166 7/1983 Kubo et al. ........................... 74/867

FOREIGN PATENT DOCUMENTS 2033033 5/1980 United Kingdom .................. 74/868

Primary Examiner—Allan D. Herrmann
Assistant Examiner—Bruce F. Wojciechowski
Attorney, Agent, or Firm—Schwartz, Jeffery, Schwaab, Mack, Blumenthal & Koch

[57] ABSTRACT

A manual valve comprises a spool having two lands slidably disposed in a bore of a housing for movement to a P range, a R range, a N range, a D range, a II range and a I range. The manual valve is formed with an inlet port and five outlet ports. The first and second outlet ports are allowed to communicate with the inlet port to receive a line pressure when the spool is set to R range. The second outlet port is allowed to communicate with said inlet port when the spool is set to N range. The second and third outlet ports are allowed to communicate with said inlet port when the spool is set to D range. The third and fourth outlet ports are allowed to communicate with the inlet port when the spool is set to II range. The third, fourth and fifth outlet ports are allowed to communicate with the inlet port when the spool is set to I range. The first inlet port, second inlet port, inlet port, third outlet port, fourth outlet port and fifth outlet port are arranged in this order along the axial direction of the spool.

6 Claims, 2 Drawing Figures

MANUAL VALVE FOR HYDRAULIC CONTROL SYSTEM FOR AUTOMATIC TRANSMISSION

BACKGROUND OF THE INVENTION

1. Field of the Invention

The present invention relates to a manual valve for a hydraulic control system for an automatic transmission.

2. Description of the Prior Art

Automatic transmissions may be classified into two groups from the standpoint of arrangement of shift valves with respect to a manual valve. One group employs a so-called "series arrangement" wherein a 2-3 shift valve is coupled with an outlet port of a 1-2 shift valve which is coupled with a single outlet port of a manual valve such that the 2-3 shift valve is supplied with a line pressure only when the 1-2 shift valve is in its upshift state. The other group employs a so-called "parallel arrangement" wheren a 2-3 shift valve is coupled with an outlet port of a manual valve different from or same as that outlet port of the manual valve with which a 1-2 shift valve is coupled.

The "parallel arrangement" of the shift valves may allow the change-speed gearbox to interlock should at least one of the shift valves be sticked to its upshift or downshift state. Therefore, it is the conventional practice to design a hydraulic control system in such a manner as to prevent the occurrence of the interlock state of the change-speed gearbox.

Another design demand is that when the manual valve is set to a manual range like II range or I range, the pressure used for engaging the friction unit which plays a role in the second gear ratio must be temporally increased or boosted so as to ensure effective engine braking.

A known hydraulic control system for an automatic transmission disclosed in U.S. Pat. No. 3,667,323 issued to Namio IRIE on June 6, 1972 and assigned to Nissan Motor Company, Limited is designed to prevent the occurrence of interlock of the gearbox and to boost the line pressure during operation in the manual range for ensuring effective engine braking. However, a manual valve used in the known hydraulic control system is formed with six (6) outlet ports. Thus, this results in a cost increase in production of the manual valve, a cost increase in processing oil conduits and openings necessary for the valve body of the manual valve. Furthermore, it is not easy to find space sufficiently wide enough for a worker to machine ports or openings for the manual valve, restricting the design freedom of the hydraulic control system.

SUMMARY OF THE INVENTION

According to the present invention, there is provided a manual valve comprising a spool slidably disposed within a bore of a housing for movement to a parking range, a reverse range, a neutral range, an automatic drive range, a manual second range and a manual first range. The housing is formed with an inlet port coupled with a pressure regulator valve to receive a line pressure. Also formed in the housing are five outlet ports. A first outlet port is allowed to communicate with the inlet port to receive the line pressure when the spool is set to the reverse range. A second outlet port is allowed to communicate with the inlet port to receive the line pressure when the spool is set to one of the reverse range, the neutral range and the automatic drive range. A third outlet port is allowed to communicate with the inlet port to receive the line pressure when the spool is set to one of the automatic drive range, the manual second range and the manual first range. A fourth outlet port is allowed to communicate with the inlet port to receive the line pressure when the spool is set to one of the manual second range and the manual first range. A fifth outlet port is allowed to communicate with the inlet port to receive the line pressure when the spool is set to the manual first range.

Accordingly, an object of the present invention to provide a simple and easy-to-manufacture manual valve which provides the associated hydraulic control system with a feature to prevent interlock in the gearbox and a feature to boost the line pressure during operation in the manual range.

BRIEF DESCRIPTION OF THE DRAWINGS

The invention will be further described hereinafter in connection with the accompanying drawings, wherein.

DESCRIPTION OF THE EMBODIMENT

Figure 1:
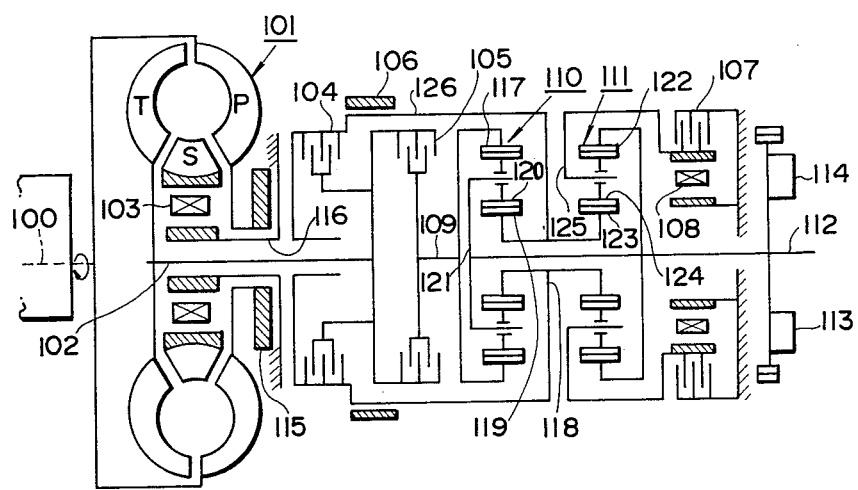
FIG. 1 is a schematic view of a change-speed gearbox used in an automatic transmission.

Referring to FIG. 1, a change-speed gearbox of an automatic transmission is illustrated which is controlled by a hydraulic control system according to the present invention. The change-speed gearbox provides three forward gear ratios and one reverse gear ratio and comprises a crank shaft 100 to be driven by an engine, a torque converter 101, an input shaft 102, a front clutch 104 (a high and reverse clutch), a rear clutch 105 (a forward clutch), a second brake 106 (an intermediate brake), a low-and-reverse brake 107, a one-way clutch 108, an intermediate shaft 109, a first planetary gear set 110, a second planetary gear set 111, an output shaft 112, a first governor valve 113, a second governor valve 114 and an oil pump 115.

The torque converter 101 comprises a pump impeller P, a turbine runner T and a stator S, of which the pump impeller P is driven by the crank shaft 100 so that the torque converter working oil contained therein is caused to swirl and imparts torque to the turbine runner T which is secured to the input shaft 102. The torque is further delivered through the input shaft 102 to the change-speed gearbox. The stator S is mounted about a sleeve 116 with a one-way clutch 103 interposed therebetween. The one-way clutch 103 is constructed and arranged in such a manner as to permit a rotation of the stator S in the same direction as the direction of rotation of the crank shaft 100, viz., the direction indicated by the arrow (abbreviated hereinafter as forward rotation) and to prevent the opposite rotation of the stator (abbreviated hereinafter as opposite rotation).

The first planetary gear set 110 comprises an internally toothed gear 117 rotatable with the intermediate shaft 109, a sun gear 119 rotatable with a hollow transmission shaft 118, two or more planet pinions 120, each meshing with the internally toothed gear 117 and the sun gear 119 so that it rotates and moves along an orbit, and a front planet carrier 121 rotatable with the output shaft 112 and having the planet pinions 120 thereon; while the second planetary gear assembly 111 comprises an internally toothed gear 122 rotatable with the output shaft 112, a sun gear 123 rotatable with the hollow transmission shaft 118, two or more planet pinions 124, each meshing with the internally toothed gear 122 and the sun gear 123 so that it rotates and moves along an orbit, and a rear planet carrier 125 having the planet pinions 124.

Referring to the friction units, the front clutch 104 is operative to establish a connection between the transmission input shaft 102 to be driven by the turbine runner T and the hollow transmission shaft 118, rotatable in unison with the two sun gears 119 and 123 through a drum 126, while the rear clutch 105 is operative to connect the input shaft 102 and the internally toothed gear 117 of the first planetary gear assembly 110 through the intermediate shaft 109. The second brake 106 is operative to tighten a band winding the drum 126 secured to the hollow transmission shaft 118 so as to lock the two sun gears 119 and 123, while the low-and-reverse brake 107 is operative to lock the rear planet carrier 125 of the second planetary gear assembly 111. On the other hand, the one-way clutch 108 is so constructed and arranged as to permit the forward rotation of the rear planet carrier 125 but prevent the opposite rotation of the same. The first governor valve 113 and second governor valve 114 are fixed to the output shaft 112 and are operative to produce a governor pressure indicative of the vehicle speed.

Description will be hereinafter made of the power flow paths which are established during operation in an automatic forward drive range (D range).

Under this condition, the rear clutch 105 serving as the forward input clutch is engaged. The power from the engine and having passed through the torque converter 101 is transmitted, through the input shaft 102 and rear clutch 105, to the internally toothed gear 117 of the first planetary gear set 110. The rotation of the internally toothed gear 117 causes the planet pinions 120 for rotation in the forward direction. Since the sun gear 119 tends to rotate in the opposite direction to urge the sun gear 123 of the second planetary gear set 111 rotatable with the sun gear 119 to rotate in the opposite direction, the planet pinions 124 of the second planetary gear set 111 tend to rotate in the forward direction. The one-way clutch 108 is operative to prevent the rear planet carrier 125 from tending to rotate in the opposite direction, so that the sun gear 123 serves as a reaction brake in the forward direction. As a consequence, the internally toothed gear 122 of the second planetary gear set 111 rotates in the forward direction. It therefore follows that the output shaft 112 rotatable with the internally toothed gear 122 also rotates in the forward direction, thereby producing the first forward gear ratio. When, under this condition, the second brake 106 is applied after the vehicle speed has increased, the power which has passed through the input shaft 102 and the rear clutch 105 as in the first gear condition is transmitted to the internally toothed gear 117. The second brake 106 is operative to lock the drum 126 to prevent rotation of the sun gear 119, thus serving as a reaction brake in the forward direction. Accordingly, the planet pinions 120 rotate and move along an orbit around the sun gear 119 which is held stationary with the result that the front planet carrier 121 and the transmission output shaft 112 integral with the former rotate in the forward direction at a speed although with a reduction ratio higher than the speed which would be achieved under the first gear ratio condition, thereby producing the second forward gear ratio. When the second brake 106 is released and the front clutch 104 is engaged after the vehicle speed has increased further, the power delivered to the input shaft 102 splits into a portion transmitted through the rear clutch 105 to the internally toothed gear 117 and into the remaining portion transmitted through the front clutch 104 to the sun gear 119. Therefore, the internally toothed gear 117 and the sun gear 119 are interlocked to rotate together with the front planet carrier 121 and the output shaft 112 at a common revolution speed in the forward direction, thereby producing the third forward gear ratio. Under this condition, the front clutch 104 and the rear clutch 105 may be referred to as an input clutch and there is no reaction brake so that the planetary gear sets do not lend themselves to multiplication of torque.

The power flow path to be established for a reverse drive range (R range) will be hereinafter described.

When this range is selected, both of the front clutch 104 and low-and-reverse brake 107 are made operative. The power from the engine having passed through the torque converter 101 is transmitted from the input shaft 102 through the front clutch 104 and the drum 126 to the sun gears 119 and 123. Since, under this condition, the rear planet carrier 125 is locked by the low-and-reverse brake 107, the rotation of the sun gears 119 and 123 in the forward direction causes the internally toothed gear 122 to rotate at a reduced speed in the reverse direction with the result that the output shaft 112 rotatable with the internally toothed gear 122 rotates in the reverse direction, thereby producing the reverse drive gear ratio.

Figure 2:
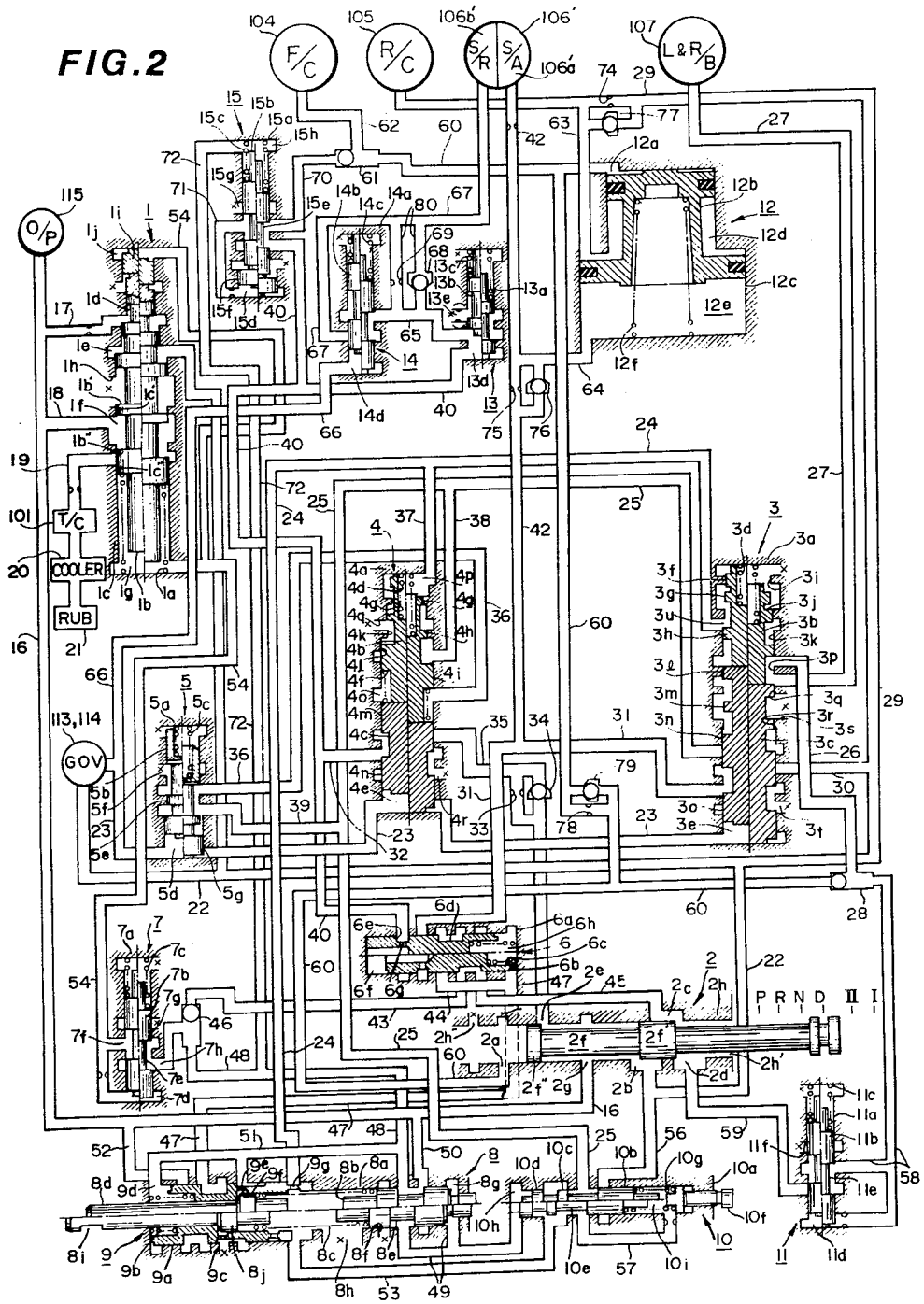
FIG. 2 is a circuit diagram showing a hydraulic control system for the automatic transmission employing a manual valve according to the present invention.

The change-speed gearbox is controlled by the hydraulic control system shown in FIG. 2.

Referring to FIG. 2, the hydraulic control system comprises in addition to a manual valve 2 according to the present invention, a regulator valve 1, a 1-2 shift valve 3, a 2-3 shift valve 4, a 3-2 downshift valve 5, a line pressure booster valve 6, a pressure modifier valve 7, a throttle valve 8, a throttle failsafe valve 9, a throttle modulator valve 10, a manual first range pressure reducing valve 11, an accumulator 12, a 2-3 timing valve 13, a 3-2 timing valve 14 and a front clutch pressure reducing valve 15, all these devices being connected as shown in the illustrated circuit network to the torque converter 101, the front clutch 104, the rear clutch 105, a band servo motor 106' for operating the second brake 106 (see FIG. 1), the low-and-reverse brake 107, the governor valves 113 and 114 and the oil pump 115.

The oil pump 115 is driven by the engine through the crank shaft 100 and the pump impeller P of the torque converter 101 and is operative to suck in an oil from an oil reservoir, not shown, the oil cleared of harmful dust by means of an oil strainer (not shown) and feeds the oil to a line pressure circuit 16 when the engine is in operation.

The regulator valve 1 which is adapted to regulate the pressure of the oil to a predetermined level compirses a valve spool 1b, which is urged by means of a spring 1a to move toward a raised position indicated by the left half of the spool in the drawing, slidably mounted within a housing 1c and also comprises four chambers 1d, 1e, 1f and 1g. To each of the chambers 1d and 1f is fed an oil pressure from the line pressure circuit 16 by way of oil conduits 17 and 18. To the chamber 1e is fed a line pressure from an outlet port 2b (from which a forward drive range pressure is produced) of the manual valve 2 through an oil conduit 22 when the manual valve 2 is in any one of D range, II range and I range. Indicated at 1i is a plug, and a chamber 1j formed above the plug 1*i* and a chamber 1*g* formed below the valve spool 1*b* are in communication with an oil conduit 54. The valve spool 1*b* has a land 1*b*' having a diameter slightly smaller than the diameter of the corresponding rib 1*c*' of the housing 1*c* so as to form therebetween a small clearance which serves as a variable-area orifice. The oil in the chamber 1*f* is constantly discharged through this clearance and a drain port 1*h* at a rate which is determined by an amount of the overlap between the land 1*b*' and the rib 1*c*' so that a line pressure with a magnitude proportional to the amount of overlap is developed in the line pressure circuit 16. The valve spool 1*b* further has a land 1*b*" which is slightly smaller in diameter than the bore 1*c*" in the housing 1*c* so as to form a small clearance therebetween so that the oil in the chamber 1*f* is supplied through this clearance and an oil conduit 19 to the torque converter 101, the oil cooler 20 and the various lubricating parts 21 in the transmission.

The line pressure developed in the line pressure circuit 16 is directed to the manual valve 2, which serves as a range selector valve. The manual valve 2 comprises a housing 2*h* formed with a bore and a valve spool 2*f* slidably disposed within the bore for movement to a parking range (P range), a reverse drive range (R range), a neutral range (N range), an automatic forward drive range (D range), a manual second range (II range), and a manual first range (I range). The spool 2*f* is formed with a first land 2*f* and a second land 2*f*" and manually operable by a selector lever mounted near a driver's seat. The housing 2*h* is formed with five outlet ports 2*a*, 2*e*, 2*b*, 2*c*, and 2*d*. Setting the spool 2*f* to any one of P range, R range, N range, D range, II range and I range allows the line pressure supplied to the inlet port 2*g* to appear at the outlet ports indicated by the sign "o" in the following table. The outlet ports which are not in communication with the inlet port 2*g* are all drained off via an end opening 2*h*' of the bore or a drain port 2*h*" formed between the other end opening of the bore and the outlet port 2*a*.

| Range | Ports | | | | |
|---|---|---|---|---|---|
| | 2a | 2b | 2c | 2d | 2e |
| P | | | | | |
| R | o | | | | o |
| N | | | | | o |
| D | | o | | | o |
| II | | o | o | | |
| I | | o | o | o | |

Referring to the arrangement of the ports, the first outlet port 2*a*, second outlet port 2*e*, inlet port 2*g*, third outlet port 2*b*, fourth outlet port 2*c* and fifth outlet port 2*d* are open to the bore of the housing 2*h* and arranged within wall means defining the bore in this order along the axial direction of the bore or spool 2*f*. The first land 2*f* is slidable on a first area of the wall means defining the bore of the housing 2*h* and the second land 2*f*" slidable on a second area of the wall means when the spool 2*f* is urged to move between P range and I range. The first outlet port 2*a* and second outlet port 2*e* are disposed within the area covered by the second land 2*f*" are adapted to be covered by the second land 2*f*". The inlet port 2*g*, the third outlet port 2*b*, fourth outlet port 2*c* and fifth outlet port 2*d* are disposed within the area covered by the first land 2*f* and are adapted to be covered by the first land 2*f*. As is clear from the table, the first outlet port 2*a* is allowed to communicate with the inlet port 2*g* to receive the line pressure when the spool 2*f* is set to R range. The second outlet port 2*e* is allowed to communicate with the inlet port 2*g* to receive the line pressure when the spool 2*f* is set to one of the R range, N range and D range. The third outlet port 2*b* is allowed to communicate with the inlet port 2*g* to receive the line pressure when the spool 2*f* is set to one of D range, II range and I range. The fourth outlet port 2*c* is allowed to communicate with the inlet port 2*g* to receive the line pressure when the spool 2*f* is set to one of II range and I range. A fifth outlet port 2*d* is allowed to communicate with the inlet port 2*g* to receive the line pressure when the spool 2*f* is set to I range.

The position of the spools 2*f* and 2*f*" the spool 2*f* relative to the inlet and outlet ports 2*a*, 2*e*, 2*g*, 2*b*, 2*c* and 2*d* is described hereinafter.

When the spool 2*f* is set to P range, the first land 2*f* is disposed in a position to cover the inlet port 2*g* and the second land 2*f*" is disposed in a position between the drain port 2*h*" and the adjacent end opening of the bore of the housing 2*h*. In this position of the spool 2*f*, the first and second outlet ports 2*a* and 2*e* are uncovered by the second land 2*f*" and thus allowed to communicate with the drain port 2*h*", while, the third, fourth and fifth outlet ports 2*b*, 2*c* and 2*d* are uncovered by the first land 2*f* and thus are allowed to communicate with the end opening 2*h*'.

When the spool 2*f* is set to R range, the second land 2*f*" is disposed in a position between the drain port 2*h*" and the first outlet port 2*a*, while, the first land 2*f* is disposed in a position between the inlet port 2*g* and the third inlet port 2*b*, uncovering the inlet port 2*g* to allow communication with the first and second outlet ports 2*a* and 2*e*.

When the spool 2*f* is set to N range, the second land 2*f*" is disposed in a position to cover the first outlet port 2*a*, while, the first land 2*f* is disposed in a position between the inlet port 2*g* and the third outlet port 2*b*, leaving the third outlet port 2*b* communicating with the end opening 2*h*'.

When the spool 2*f* is set to D range, the second land 2*f*" is disposed in a position between the second outlet port 2*e* and said inlet port 2*g*, while, the first land 2*f* is disposed in a position between the third outlet port 2*b* and fourth outlet port 2*c*.

When the spool 2*f* is set to II range, the second land 2*f*" is disposed in a position between the second outlet port 2*e* and the inlet port 2*g*, while, the first land 2*f* is disposed in a position between the fourth and fifth outlet ports 2*c* and 2*d*.

When the spool 2*f* is set to I range, the second land 2*f*" is disposed in a position between the second outlet port 2*e* and the inlet port 2*g*, while, the first land 2*f* is disposed in a position between the fifth outlet port 2*d* and the end opening 2*h*' of the bore of the housing 2*h*.

The first governor valve 113 and the second governor valve 114 are operative to develop a governor pressure indicative of vehicle speed under forward drive range condition including automatic forward drive (D) range, manual second (II) range and manual first (I) range. When the manual valve 2 is set in D range or II range or I range, the line pressure is first fed to the second governor valve 114 through the outlet port 2*b* which is allowed to communicate with the line pressure circuit 16 as will be understood from the above table and through an oil conduit 22. When vehicle is moving forwardly, the line pressure in the second governor valve 114 is regulated thereby into governor pressure indicative of the vehicle speed, the governor pressure being extended to the first governor valve 113. When the vehicle speed increases beyond a predetermined value, the first governor valve 113 allows the governor pressure into a governor pressure circuit 23. The governor pressure is thereafter distributed through the circuit 23 to the 1-2 shift valve 3, 2-3 shift valve 4 and 3-2 downshift valve 5.

In the following several paragraphs, a so-called "parallel arrangement" of the 1-2 shift valve 3 and 2-3 shift valve 4 with respect to the manual valve 2 is described.

As shown in FIG. 2, the 1-2 shift valve 3 is coupled with outlet port 2b of the manual vlve 2 via an oil conduit 30 branching from an oil conduit 29 that branches from the oil conduit 22 extending from the outlet port 2b to the governor valves 113 and 114. The 2-3 shift valve, on the other hand, is coupled with outlet port 2e of the manual valve 2 via an oil conduit 35.

The 1-2 shift valve 3 comprises a housing 3a and two valve spools 3b and 3c which are arranged axially in line with each other and which are slidably mounted within the housing 3a. That end face of the valve spool 3b which is remoter from the valve spool 3c is acted upon by a spring 3d and that end face of the valve spool 3c which is remoter from the valve spool 3b is located in a chamber 3e. The valve spool 3b is formed with lands 3f, 3g and 3h which are larger in diameter in this sequence, while the housing 3a is formed with ribs 3i, 3j and 3k which are associated with these lands, respectively. The valve spool 3c is further formed with lands 3e and 3m and lands 3n and 3o larger in diameter than the former two, while the housing 3a is formed with two ribs 3p and 3q associated with the lands 3e and a rib 3r associated with the land 3m. The 1-2 shift valve 3 is in communication with the governor pressure circuit 23, a kickdown pressure circuit 24 and a gear shift control pressure circuit 25 as shown in the drawing and further with an oil conduit 27 which is to communicate with an oil conduit 26 or a drain port 3s depending upon the axial position of the land 31. The governor pressure circuit 23 communicate with the groove between the lands 3g and 3h when the valve spool 3b is in the position indicated by the right half thereof and with the groove between the lands 3g and 3h and the groove between the lands 3f and 3g when the valve spool 3b is in the position indicated by the left half thereof. On the other hand, the gear shift control pressure circuit 25 is to be in communication with the groove between the lands 3m and 3n when the valve spool 3c is in the position indicated by the right half of the spool and to be closed by the land 3n when the valve spool 3c is in the position indicated by the left of the spool. The oil conduit 26 is in communication with an output port of a shuttle valve 28, and the oil conduit 27 is in communication with the low-and-reverse brake 107. The 1-2 shift valve 3 is further in communication with the oil conduit 30 extending from the oil conduit 29 branching to the rear clutch 105 from the oil conduit 22 extending from the port 2b of the manual valve 2 to the governor valves 113 and 114, and is also in communication with an oil conduit 31 which is allowed to communicate with the oil conduit 30 or is prevented from communicating with it depending upon the axial position of the land 3n and which conduit 31 leads to a line pressure booster valve 6. The oil conduit 31 communicates with a drain port 3t when the spool 3c is in the position indicated by the right half of the spool. In the oil conduit 29 is provided an orifice 74 and a check valve 77 which are arranged in parallel.

The 2-3 shift valve 4 comprises a housing 4a having two valve spools 4b and 4c axially arranged in line with each other and slidably mounted within the housing. That end face of the valve spool 4b which is remoter from the valve spool 4c is acted upon by a spring 4d, while that end face of the valve spool 4c which is remoter from the valve spool 4b is located in a chamber 4e with a spring 4f provided as compressed between the valve spools 4b and 4c. The valve spool 4b is formed with lands 4g, 4h and 4i which are larger in diameter in this sequence, while the housing 4a is formed with ribs 4j, 4k and 4l which are respectively associated with these lands. The valve spool 4c is formed with two lands 4m and 4n, and connected with the 2-3 shift valve 4 is an oil conduit 32 which is permitted to communicate with or isolated from an oil conduit 35 provided with an orifice 33 and a check valve 34 depending upon the axial position of the land 4m, the oil conduit 35 being connected to a port 2e of the manual valve. When the valve spool 4c is in the position indicated by the right half thereof, the oil conduit 35 is blocked by the land 4m and a chamber 4o defined between both of the spools 4b, 4c is connected to an oil conduit 36 extending from a 3-2 downshift valve 5 which will be described later. The chamber 4e is in communication with the governor pressure circuit 23 and a chamber 4p having the spring 4d accommodated therein is in communication with the kickdown pressure circuit 24 through an oil conduit 37. The kickdown pressure circuit 24 is such that a kickdown pressure is applied to the upper pressure acting face of the land 4g when the valve spool 4b is in the position indicated by the right half thereof and to the upper and lower pressure acting faces of the land 4g when the valve spool 4b is in the position indicated by the left half thereof.

The 2-3 shift valve 4 is further in communication with the gear shift control pressure circuit 25 through an oil conduit 38 so that a gear shift control pressure is developed between the land 4h and the land 4i, when the valve spool 4b is in the position indicated by the right half thereof. There is further provided a drain port 4q which is to be open to the groove between the land 4h and the land 4i when the valve spool 4b is in the position indicated by the left half thereof.

The 3-2 downshift valve 5 comprises a housing 5a having a valve spool 5b slidably mounted therein. The valve spool 5b has one end face acted upon by a spring 5c and the other end face located in a chamber 5d. The 3-2 downshift valve 5 is in communication with the above mentioned oil conduit 36 in such a manner as to communicate with either an oil conduit 39 leading from the gear shift control pressure circuit 25 or a drain port 5f depending upon the axial position of a land 5e, a chamber 5d being in communication with the governor pressure circuit 23.

The line pressure booster valve 6 comprises a housing 6a having a valve spool 6b slidably mounted therein, the valve spool 6b being urged to move leftwardly in the drawing by means of a spring 6c. The valve spool 6b is formed with grooves 6d and 6e and an oil conduit 6g for providing communication between the groove 6e and a chamber 6f. The line pressure booster valve 6 is in communication with an oil conduit 40 to be open to the groove 6e when the valve spool 6b is moved to the left of an oil conduit 31 to be open to the groove 6e when the valve spool 6b is moved to the right. The oil conduit 40 is joined to the oil conduit 32 and is thus in communication with the 2-3 timing valve 13 and the front clutch pressure reducing valve 15, while the oil conduit 31 is in communication via an oil conduit 42 with a servo apply chamber 106'a of a band servo 106'. The line pressure booster valve 6 is further in communication with an oil conduit 43 which is constantly open to the groove 6d and with oil conduits 44 and 45 which are to be selectively brought into communication with the oil conduit 43 through the groove 6d and with oil conduits 44 and 45 which are to be selectively brought into communication with the oil conduit 43 through the groove 6d depending upon the axial position of the valve spool 6b. The oil conduit 43 is in communication with one input port of a shuttle valve 46 and the oil conduit 44 is in communication with the throttle failsafe valve 9 through an oil conduit 47 leading from a chamber 6h having the spring 6c accommodated therein, while the oil conduit 45 is in communication with the port 2c of the manual valve 2.

The transmission throttle valve 8 comprises a housing 8a having a valve spool 8b slidably mounted therein and a plunger 8d provided in line with the valve spool 8b across a spring 8c. The plunger 8d is connected to the accelerator pedal by means of, for example, a mechanical linkage and is adapted to move rightwardly in the drawing from an idling position indicated by the lower half of the plunger thereby to add to the force of the spring 8c as the accelerator pedal is depressed. The valve spool 8b is formed with a groove 8e and a throttle pressure circuit 48 and an oil conduit 49 are provided in communication with the throttle valve 8 in such a manner as to be always open to the groove 8e. The throttle valve 8 is further provided with a drain port 8f which can communicate with the throttle pressure circuit 48 through the groove 8e depending upon the axial position of the valve spool 8b, and communicates with an oil conduit 50 leading from the line pressure circuit 16, the oil conduit 49 being in communication with a chamber 8g. Increasing the force of the spring 8 by moving the plunger 8d rightwardly as the accelerator pedal is depressed causes a throttle pressure to be created within the chamber 8g and fed to the throttle pressure circuit 48, the throttle pressure being determined so as to balance with the spring force of this spring by relieving the line pressure fed to this chamber from the oil conduit 50 by drainage through the drain port 8f. Thus, the throttle valve 8 delivers, by modifying the line pressure, a throttle pressure which corresponds to the force of the spring 8c (viz., the distance of stroke of the accelerator pedal depressed) and which is proportional to the throttle opening degree. When the accelerator pedal is depressed to a kickdown position, the plunger 8d compresses the spring 8c to a full extent and is brought into abutting engagement with the valve spool 8b and forces the valve spool 8b to move to a limit position closing the drain port 8f thereby to provide communication between the throttle pressure circuit 48 and the oil conduit 50. Under this condition, the throttle pressure is equal in magnitude to the line pressure.

The throttle pressure circuit 48 is in communication with the other inlet port of the shuttle valve 46 and further leads to the throttle failsafe valve 9 through an oil conduit 51. The throttle failsafe valve 9 comprises a sleeve 9a which is slidably mounted within a housing 8a in such a manner as to be capable of guiding the plunger 8d, the leftward movement of the sleeve being elastically limited by means of a spring 9b. The oil conduit 47 providing communication between the line pressure booster valve 6 and the throttle failsafe valve 9 is normally open to the drain port 9c of the throttle failsafe valve 9. The oil conduit 51 is in communication with a chamber 9d receiving the spring 9b on one hand and on the other hand through a port 9d with a chamber 9f to which an enlarged portion 8j of the plunger 8d is exposed, the kickdown pressure circuit 24 communicating with a port 9g. An oil conduit 52 leads from the line pressure circuit 16 to the throttle failsafe valve 9 wherein this oil conduit is normally closed, but under an abnormal condition when the sleeve 9a takes the lower half position in the drawing, the oil conduit 52 communicates with the coil conduit 47, the operation of this valve under this condition being described in detail later. During the movement of the plunger 8d in such a direction as being depressed, the throttle pressure developed in the throttle pressure circuit 48 is directed through the oil conduit 51 and the port 9e to the chamber 9f and acts on the enlarged portion 8j of the plunger 8d and exerts to the plunger 8d a force effective to move the plunger inwardly against the force of the spring 8c, so the accelerator pedal is prevented from being excessively loaded by the spring 8c when the pedal is depressed. When, furthermore, the plunger 8d is urged to move to a kickdown position, the kickdown pressure circuit 24 which has been in communication with the drain port 8h through the port 9g is now isolated from the drain port 8h and is permitted to communicate with the oil conduit 51 through the port 9e, chamber 9f and port 9g. Under this condition, the valve spool 8b moves rightwardly in the drawing as previously described and, as a consequence, the line pressure in the oil conduit 50 is passed to the pressure circuit 48 without being drained off, thereby developing in the circuit 24 a kickdown pressure which is equal, in magnitude, to the line pressure. The kickdown pressure thus delivered is supplied also to the throttle modulator valve 10 by way of an oil conduit 53. If a damage should take place in the mechanical linkage interconnecting the accelerator pedal and the plunger 8d and the plunger 8d should disengage from the accelerator pedal, the plunger 8d would be urged to move by a return spring, now shown, to the idling position which is indicated by the lower half of the plunger, so the plunger 8d would force the sleeve 9a to move leftwardly into the position indicated by the lower half thereof. There being no force imparted to the valve spool 8b by the spring 8c under this condition, the valve spool 8b assumes a position allowing the drain port 8f to be slightly open and substantially fully closing the oil conduit 50. Furthermore, the oil conduit 51 is on one hand in communication with the drain port 9c through the port 9e and the chamber 9f for maintaining the throttle pressure at zero level and on the other hand permits the oil conduit 47 to communicate with the oil conduit 52 for directing the line pressure to the oil conduit 47. The line pressure thus developed in the oil conduit 47 is passed through the line pressure booster valve 6, the oil conduit 43 and the shuttle valve 46 to the pressure modifier valve 7 and is modified into a pressure which is equal to the force of the spring 7c in a state wherein the valve spool 7b is held in the position indicated by the left half thereof, the modified throttle pressure having its maximum value being further directed to the chambers 1g and 1j of the pressure regulator valve 1 through oil conduit 54 for thereby boosting the line pressure to its maximum value. As a consequence, the friction units are actuated by the line pressure having the maximum magnitude and thus enables the vehicle to run to a repair shop without any assistance thereto and without causing a burnt damage due to a slip in the friction units.

The pressure modifier valve 7 comprises a housing 7a having a valve spool 7b slidably mounted within the housing and having one end face acted upon by a spring 7c and the other end face located in a chamber 7d. The valve spool 7b is formed with a groove 7e, while the housing 7a is formed with an outlet port 7f always open to the groove, a drain port 7g and an inlet port 7h. The ports 7g and 7h are arranged in such a manner that one of the ports is about to be opened when the other of the ports is about to be closed during movement of the valve spool 7b. The port 7f is in communication on the one hand with the chamber 7d and on the other hand with the chamber 1g and the chamber 1j into which projects the plug 1i disposed in series with the valve spool 1b in the pressure regulator valve 1, while the port 7h is in communication with the outlet port of the shuttle valve 46.

With the pressure modifier valve 7 thus constructed, the spring 7c holds the valve spool 7b in a position which is lower than the position indicated by the left half in the drawing when the oil pressure developed in the port 7h is less than a set force of the spring 7c (the set force of the spring 7c being a force as achieved when the valve spool 7b is held in the position indicated by the left half thereof), thereby closing the drain port 7g and providing communication between the port 7f and the port 7h so that the oil pressure developed in the port 7h is directed to the port 7f and further through the oil conduit 54 to the regulator valve 1. Under this condition, the oil pressure is directed also to the chamber 7d and causes the valve spool 7b to move from the position indicated by the right half thereof to the position indicated by the left half thereof against the force of the spring 7c as the oil pressure increases. If, however, the oil pressure to be delivered from the port 7f tends to further increase, the valve spool 7b is urged to move upwardly beyond the position indicated by the left half of the spool and permits the port 7f to communicate with the drain port 7g with the result that the oil pressure to be delivered to the oil conduit 54 can not be augmented beyond a certain value which is dictated by the force of the spring 7c under a condition in which the valve spool 7b is held in the position indicated by the left half thereof, so that when the throttle pressure in the throttle pressure conduit 48 is supplied via the shuttle valve 46 to the port 7h, the pressure modifier valve 7 produces an oil pressure called modified throttle pressure which varies such that it increases with an increase in the throttle opening degree till two fourths (2/4) of the full opening degree but stops increasing thereafter.

The throttle modulator valve 10 comprises a housing 10a having slidably mounted therein a valve spool 10e which is formed with three lands 10b, 10c and 10d and which has one end face acted upon by a spring 10g having a spring force adjustable by means of an adjuster 10f and the other end face located in a chamber 10h. The circuit 25 is arranged in the housing 10a in such a manner as to be at all times open to the groove between the lands 10b and 10c, while, an oil conduit 53 and an oil conduit 56 extending from the port 2b of the manual valve 2 are arranged in the housing 10a in such a manner that one of these oil conduits is about to be opened when the other thereof is about to be completely closed during movement of the valve spool 10e. The housing 10a is further connected with an oil conduit 57 aligned with the oil conduit 25, the oil conduit 57 being in communication with a chamber 10i having a spring 10g accommodated therein. Furthermore, a chamber 10h is provided which is in communication with the throttle valve 8 through an oil conduit 49.

With the throttle modulator valve 10 thus constructed, the valve spool 10e is held in the position indicated by the lower half thereof by the force of the spring 10g when the throttle pressure directed through the oil conduit 49 into the chamber 10h is zero. Under this condition, the oil conduit 56 extending from the manual valve 2 is isolated from the circuit 25 and the oil conduit 57 by means of the valve spool 10b and the gear shift control pressure circuit 25 and the oil conduit 57 are held in communication with the drain port 8h through the oil conduit 53 and the port 9g of the throttle failsafe valve 9 so that there is no oil pressure developed in the circuit 25 and the oil conduit 57. As the throttle pressure rises, the valve spool 10e is urged to move beyond the position indicated by the position indicated by the upper half thereof against the force of the spring 10g to permit the line pressure which is directed from the port 2b of the manual valve 2 to the oil conduit 56. The line pressure is further applied through the oil conduit 57 to the chamber 10i, and cooperates with the force of the spring 10g, to move the valve spool 10e back toward the balanced position indicated by the upper half thereof. The throttle modulator valve 10 is thus capable of regulating the line pressure from the oil conduit 56 by the throttle pressure directed into the chamber 10h, thereby delivering a modulated throttle pressure to the gear shift control circuit 25 which appears in response to a throttle opening degree larger than, for instance, two fourths (2/4) of the full opening degree and which thereafter varies substantially in direct proportion to the throttle valve opening degree. Under kickdown condition in which the plunger 8d of the throttle valve 8 moves inwardly, the port 9g is isolated from the drain port 8h as previously discussed and, as a consequence, the throttle pressure having the same magnitude as the line pressure is fed from the port 9g to the throttle modulator valve 10 by way of the oil conduit 53 so that oil pressure with the same magnitude as the line pressure is developed in the gear shift control pressure circuit 25 and the oil conduit 57 and is directed to the chamber 10i for urging the valve spool 10e to move to the leftward limit position thereof with the result, under kickdown condition, oil pressure equal in magnitude to the line pressure is always developed in the circuit 25.

The manual first range pressure reducing valve 11 comprises a housing 11a having slidably mounted therein a valve spool 11b which has one end face acted upon by a spring 11c and the other end face located in a chamber 11d. The valve spool 11b is formed with a groove 11e and the housing 11a is formed with an oil conduit 58 which is constantly open to the groove, the oil conduit 58 being in communication with one inlet port of the shuttle valve 28 and with the chamber 11d. The housing 11a is further formed with a drain port 11f and is in communication with an oil conduit 59 extending from the outlet port 2d of the manual valve 2, the drain port 11f and oil conduit 59 being arranged in such a manner that one of them is about to be opened when the other is about to be completely closed during movement of the valve spool 11b.

Thus, the manual first range pressure reducing valve 11 is operative to partially discharge the line pressure directed from the manual valve 2 to the oil conduit 59 and reduces the line pressure to a constant oil pressure level determined by the force of the spring 11c in a condition indicated by the left half thereof when the I range is selected, the pressure thus obtained being delivered to the oil conduit 58 so that the low-and-reverse brake 107 which is to be also operative under reverse drive condition is precluded from producing an excessively large torque transmission capacity.

The port 2a of the manual valve 2 is in communication with the other inlet port of the shuttle valve 28 through an oil conduit 60 and further with one inlet port of a shuttle valve 61, the outlet port of the shuttle valve 61 being in communication with the front clutch 104 through an oil conduit 62. The oil conduit 60 which leads to the front clutch 104 has provided therein a parallel combination of an orifice 78 and a check valve 79 and is branched at downstream of these elements for communication with a chamber 12a of the accumulator 12. The accumulator 12 comprises a stepped piston 12b and a stepped cylinder 12c having the piston slidably fitted therein for defining two chambers 12d and 12e in addition to the above mentioned chamber 12a in the cylinder, the piston 12b being urged to move upwardly in the drawing by means of a spring 12f. The chamber 12d is in communication with the oil conduit 29 through an oil conduit 63, while the chamber 12e is in communication with the oil conduit 42 through an oil conduit 64. The oil conduit 42 is arranged with a parallel combination of an orifice 75 and a check valve 76 which are located upstream of the accumulator 12.

The 2-3 timing valve 13 comprises a housing 13a having slidably mounted therein a valve spool 13b which has one end face acted upon by a spring 13c and the other end face located in a chamber 13d, the chamber 13d being in communication with the oil conduit 40. The valve spool 13b is urged by means of the spring 13c to move toward a lower position allowing an oil conduit 65 to be open to a drain port 13e as indicated by the right half of the spool and is movable into an upper position allowing the oil conduit 65 communicate with the oil conduit 40 through the chamber 13d as indicated by the left half of the spool in the drawing.

The 3-2 timing valve 14 comprises a housing 14a having slidably mounted therein a valve spool 14b which has one end face acted upon by a spring 13c and the other end face located in a chamber 14d. The valve spool 14b is responsive to the governor pressure directed from the governor pressure circuit 23 to the chamber 14d by way of an oil conduit 66 and is movable into a lower position allowing the oil conduit 65 to be open to an oil conduit 67 leading to the servo release chamber 106'b of the band servo 106' as indicated by the right half of the valve spool 14b and an upper position isolating the oil conduit 65 from the oil conduit 67 as indicated by the left half of the spool. Between the oil conduits 65 and 67 is provided a parallel combination 80 of a check valve 68 and an orifice 69 which bypasses the 3-2 timing valve 14.

The front clutch pressure reducing valve 15 comprises a housing 15a having slidably mounted therein a valve spool 15b which has one end face acted upon by a spring 15c and the other end face located in a chamber 15d. The valve spool 15b is formed with a groove 15e forming lands on both sides thereof and further with a land 15f which is larger in diameter than these lands. On the other hand, the housing 15a is formed with an oil conduit 70 which is always open to the groove 15e and which is in communication with the other input port of the shuttle valve 61. The housing 15a is further formed with a drain port 15g and is in communication with the oil conduit 40, the drain port and the oil conduit being arranged so that one of them is permitted to open when the other of them is completely closed during movement of the valve spool 15b. The housing 15a is still further formed with an oil conduit 71 which is open in radial alignment with the oil conduit 70 and which is in communication with the chamber 15d. A chamber 15h having the spring 15c mounted therein is in communication with the throttle pressure circuit 48 through an oil conduit 72.

With the front clutch pressure reducing valve 15 thus arranged, the valve spool 15b is urged by the spring 15c to move toward a lower position isolating the oil conduit 70 from the drain port 15g and connected to the oil conduit 40 as indicated by the right half of the valve spool. When, therefore, the line pressure is directed through the oil conduit 35 to the oil conduit 40 under the control of the 2-3 shift valve 4 as will be described later, the line pressure is directed through the oil conduit 70 and the shuttle valve 61 to the front clutch 104. Since, however, the line pressure thus conducted is restricted by the orifice 33 in the oil conduit 35, it increases initially at a limited rate and thereafter at a gradually increasing rate. Such a pressure is also fed through the oil conduit 71 to the chamber 15d and causes the valve spool 15b to move upwardly in the drawing. On the other hand, the chamber 15h is supplied with the throttle pressure which is directed from the throttle pressure circuit 48 by way of the oil conduit 72 and which is proportional to the throttle valve opening degree. In cooperation with the force of the spring 15c, the throttle pressure causes the valve spool 15d to move downwardly in the drawing until the valve spool 15b rests in a position in which the downward force thus applied thereto is rendered equal to the force urging the spool upwardly. When the pressure being supplied to the front clutch 104 reaches a predetermined level after the pressure has appeared, the valve spool 15b is urged to move upwardly into the position having the oil conduit 70 isolated from the oil conduit 40 and brought into communication with the drain port 15g as indicated by the left half of the spool and is balanced in the particular position. For this reason, the oil pressure supplied to the front clutch can not be increased beyond the above mentioned predetermined value. Because, however, of the fact that the throttle pressure is directed into the chamber 15h and lend itself to the control of the pressure to be supplied to the front clutch, the pressure supplied to the front clutch increases as the throttle valve opening degree increases. Under kickdown condition, on the other hand, the throttle pressure rises to the level of the line pressure as previously noted with the result that the oil pressure supplied to the front clutch also varies with the throttle valve opening degree.

The operation of the hydraulic control system as has been hereinbefore described will be explained in the following.

The pressure regulator valve 1 is supplied with the pump pressure directed to the chamber 1d from the oil pump 115, the modified throttle pressure directed to the chamber 1j from the pressure modifier valve 7, and thus the valve spool 1b is urged to move downwardly in the drawing. Into the chamber 1g is directed the modified throttle pressure which, in cooperation with the force of the spring 1a, urges the valve spool 1b to move upwardly in the drawing. The valve spool 1b is held in a position in which the forces thus exerted thereon are balanced, thereby developing in the circuit 16 a line pressure which is determined by such a position of the valve spool. The line pressure thus developed is directed through the circuit 16 to the inlet port 2g of the manual valve 2. When the manual valve 2 is set in P range or R range or N range, the chamber 1e of the pressure regulator valve 1 is drained off through the port 2b of the manual valve 2 with the result that the line pressure in the circuit 16 becomes higher than that achieved in D range or II range or I range because of the fact that there is no force effective to urge the valve spool 1b to move downwardly in the absence of the line pressure in the chamber 1e of the pressure regulator valve 1.

When the driver urges the spool 2f of the manual valve 2 to move from N range position to D range position, the line pressure circuit 16 is permitted to communicate with the outlet ports 2b and 2e. The line pressure in the outlet port 2b is directed on one hand through the oil conduit 56 to the throttle modulator valve 10 and on the other hand through the oil conduits 22 and 29 to the rear clutch 105. The line pressure in the port 2e is directed through the oil conduit 41 to the inlet port 4s of the 2-3 shift valve 4, but, it is prevented from extending further beyond the 2-3 shift valve 4 because the spool 4c is in the downshift position as illustrated by the right half in the drawing and closes the inlet port 4s. The line pressure directed through the oil conduit 56 to the throttle modulator valve 10 is modulated into the previously mentioned modulated throttle pressure and is delivered to the oil conduit 25. The line pressure being passed through the oil conduit 29 is restricted by the orifice 74 on its way to the rear clutch 105 and is fed to the rear clutch 105 initially at a limited rate and thereafter at a gradually increasing rate. The pressure thus fed to the rear clutch is also directed through the oil conduit 63 to the chamber 12d of the accumulator 12 and causes the stepped piston 12b to move downwardly toward the large-diameter side against the force of the spring 12f. By virture of this, the oil pressure supplied to the rear clutch 105 is augmented slowly so that the rear clutch 105 is enabled to couple softly without producing shocks encountered with the selection of D range from N range. The rear clutch being thus coupled, the automatic transmission enables the vehicle to move off from the rest with the first gear ratio. The line pressure passing through the oil conduit 29 is directed through the oil conduit 30 to the 1-2 shift valve 3, but, it is prevented from extending further beyond the 1-2 shift valve 3 because the spool 3c is in the downshift position as illustrated by the right half is the drawing and closes the oil conduit 30.

The line pressure from the port 2b of the manual valve 2 is directed through the oil conduit 22 also to the governor valves 113 and 114, which deliver to the circuit 23 governor pressure indicative of vehicle speed. The port 2b of the manual valve 2 being always open to the line pressure circuit 16 and thus allowing the line pressure to extend to the oil conduit 22 throughout the forward drive ranges including D range, II range and I range, the governor pressure is delivered into the governor pressure circuit 23 when the manual valve 2 is in the forward drives ranges.

When the vehicle speed reaches a certain value, the governor pressure varying with the vehicle speed and directed to the chamber 3e of the 1-2 shift valve 3 overcomes the downward force with which the spring 3d urges the valve spools 3b and 3c toward the positions indicated by the right halves of the spools illustrated in the drawing and the downward force with which the modulated throttle pressure directed from the circuit 25 acts on the differential pressure acting area between the lands 3m and 3n, causing the valve spools 3b and 3c to move upwardly from the downshift state indicated by the right halves thereof. When the land 3m moves beyond the rib 3r during such movement of the valve spools, the chamber formed between the lands 3m and 3n is brought into communication with the drain port 3s and at the same time the modulated throttle pressure directed from the oil conduit 25 acts on the differential pressure acting area between the lands 3m and 3n, eliminating the downward force which has been exerted on the valve spool 3c and thereby causing the valve spools 3b and 3c to move instantaneously into the positions indicated by the left halves of the spools. As a consequence, the oil conduit 30 branching from the oil conduit 29 is permitted to communicate with the oil conduit 31 so that the line pressure which has been directed to the oil conduit 29 is passed through the oil conduit 30 and the 1-2 shift valve 3 to the oil conduit 31. The line pressure is thereafter fed to the servo apply chamber 106'a of the band servo motor 106' by way of the oil conduit 42 and is restricted by the orifice 75 on its way toward the servo apply chamber 106'a with the result that the servo apply pressure increases initially at a restricted rate and thereafter at a gradually increasing rate. The servo apply pressure is directed by way of the oil conduit 64 to the chamber 12e of the accumulator 12 so that the stepped piston 12b which has moved into the lowered position thereof as previously described is urged to move back by the servo apply pressure which acts on the piston in cooperation with the force of the spring 12f. This causes the servo apply pressure to rise slowly and enables the band servo motor 106' to apply the second brake 106 (see FIG. 1) slowly. The second brake 106 being thus applied, a shift is made from the first gear ratio to the second gear ratio in the automatic transmission having the rear clutch 105 maintained in the coupled state. The gear shift shock to be produced during shifting operation is alleviated by the above described operation of the accumulator 12.

As the vehicle speed further increases under condition in which the vehicle is moving with the second gear ratio, the governor pressure indicative of the vehicle speed and directed through the governor pressure circuit 23 to the chamber 4e of the 2-3 shift valve 4 overcomes the downward force with which the spring 4d urges the valve spools 4b and 4c and the downward force with which the modulated throttle pressure directed from the conduits 25 and 38 acts on the differential area between the land 4h and land 4i, thereby causing the valve spools 4b and 4c to move upwardly from the downshift state indicated by the right halves of the spools. When the land 4h moves beyond the rib 4k during such movement of the valve spools, the chamber formed between the lands 4h and 4i is permitted to communicate with the drain port 4q for eliminating the downward force which has been caused by the modulated throttle pressure, thereby causing the valve spools 4b and 4c to instantaneously move upwardly into the upshift state indicated by the left halves of the spools.

As a consequence, communication is provided between the oil conduit 35 and oil conduit 32, with the result that the line pressure which has been directed to the port 4s through the oil conduit 35 as previously described is passed through the 2-3 shift valve 4 and the oil conduit 32 to the oil conduit 40. The line pressure thus passed to the oil conduit 40 is extended through the passages 6e and 6g of the line pressure booster valve 6 to the chamber 6f of the valve for causing the valve spool 6b to move rightwardly in the drawing from the position indicated by the upper half to the position indicated by the lower half of the valve spool and is further directed to the chamber 13d of the 2-3 timing valve 13 and the corresponding port of the front clutch pressure reducing valve 15. Since, in this instance, the line pressure to be directed to the oil conduit 40 is restricted by the orifice 33 mounted in the oil conduit, the pressure passed to the former conduit rises initially at a restricted rate and thereafter at a gradually increasing rate. It therefore follows that the oil pressure directed from the oil conduit 40 to the chamber 13d is initially unable to move the valve spool 13b against the force of the spring 13c and permits the valve spool 13b to stay in the position indicated by the right half thereof. Likewise, the pressure which has been directed from the oil conduit 40 to the chamber 15d of the front clutch pressure reducing valve 15 by way of the oil conduit 71 is initially unable to overcome the downward force exerted on the valve spool 15b by the spring 15c and the downward force exerted on the valve spool by the throttle pressure directed from the throttle pressure circuit 48 to the oil conduit 72 and is not capable of urging the valve spool to move upwardly from the position indicated by the right half thereof. For this reason, the pressure directed from the oil conduit 40 to the chamber 13d is prevented from extending beyond the chamber with the result that the pressure fed from the oil conduit 40 to the front clutch pressure reducing valve 15 is passed unmodulated through the oil conduit 70 and the shuttle valve 61 and is fed through the oil conduit 62 to the front clutch 104. As the pressure in the oil conduit 40 rises thereafter and causes the valve spool 15b to move upwardly into the position indicated by the left half thereof, the front clutch 104 is supplied with an oil pressure which is produced by reducing and modifying the line pressure in accordance with the throttle pressure in the oil conduit 72 by the previously described pressure modifying function of the front clutch reducing valve 15 and which is thus substantially proportional to the output energy of the engine. At a time when the oil pressure in the oil conduit 40 is increased to a value capable of overcoming the force of the spring 13c, the oil pressure causes the valve spool 13b to move upwardly from the position indicated by the right half to the position indicated by the left half of the valve spool so that the chamber 13d is permitted to communicate with the oil conduit 65 and as a consequence the pressure which has been directed to the chamber 13d by way of the oil conduit 40 is passed to the oil conduit 65. The pressure is thereafter passed through the oil conduit 65 and further through the oil conduit 80 provided with the check valve 68 and is fed by way of the oil conduit 67 to the servo release chamber 106'b. When the line pressure is thus supplied to the servo release chamber 106'b, the piston of the band servo motor 106' moves back toward the servo apply chamber 106'a since the pressure acting area of the servo apply chamber 106'a is smaller than that of the servo release chamber 106'b. After the prssure supplied to the front clutch 104 is increased beyond a certain value by virtue of the above described function and the front clutch is enabled to commence the coupling action thereof, the supply of the pressure to the servo release chamber 106'b is effected (viz., the second brake 106 is released by the servo motor 106') so that the coupling motion of the front clutch 104 is slightly overlapped in time with the the release of the second brake 106. Thus, the engine is prevented from racing that would otherwise occur if the front clutch and the second brake are allowed to be inoperative concurrently. A shift is made from the second gear ratio to the third gear ratio in the automatic transmission in the above-mentioned manner.

As the vehicle speed rises a certain value while the vehicle is moving with the third gear ratio, the governor pressure directed from the governor pressure circuit 23 to the chamber 5d of the 3-2 downshift valve 5 causes the spool 5b of the valve 5 to move upwardly from the position indicated by the left half thereof against the force of the spring 5c. If the accelertor pedal is depressed and as a consequence the throttle valve opening degree is increased under such condition, the modulated throttle pressure indicative of the valve opening degree and directed from the gear shift control pressure circuit 25 to the 3-2 downshift valve 5 by way of the oil conduit 39 acts on the differential area between the land 5e and land 5g and, in cooperation with the spring 5c, causes the valve spool 5b to move downwardly into the position indicated by the right half of the spool 5b. Communication is now provided between the oil conduit 36 and oil conduit 39 so that the modulated throttle pressure is fed through the oil conduit 39 and 36 and the shuttle valve 34 to the chamber 4o of the 2-3 shift valve 4 and causes the valve spool 4c to move downwardly from the upshift position indicated by the left half to the downshift position indicated by the right half thereof against the force resulting from the governor pressure developed in the chamber 4e. This causes the oil conduit 32 to be isolated from the oil conduit 35 so that the supply of the line pressure to the oil conduit 32 is interrupted and at the same time the oil conduit 32 is permitted to communicate with the drain port 4r whereby the oil pressure which has been fed to the front clutch 104 and the servo release chamber 106'b under the third gear ratio condition is now discharged in the manner to be described in the following. As the oil pressure in the chamber 15d of the front clutch pressure reducing valve 15 is eliminated and as a consequence the valve spool 15b is urged to move by the force of the spring 15c to the position providing communication between the oil conduits 40 and 70 as indicated by the right half of the valve spool, the front clutch pressure is discharged at a comparatively high rate through the oil conduit 62, the shuttle valve 61, the oil conduits 70, 40 and 32 and the drain port 4r. Since, on the other hand, there is no oil pressure developed in the chamber 13d of the 2-3 timing valve 13, the valve spool 13b is urged to move by the force of the spring 13c into the position allowing the oil conduit 65 to open to the drain port 13e as indicated by the right half of the valve spool, the servo release pressure is discharged at a comparatively low rate through the oil conduit 67, the oil conduit 80, the orifice 69, the oil conduit 65 and the drain port 13e. When the vehicle speed decreases by a certain degree under this condition, the governor pressure indicative of this vehicle speed and directed from the governor pressure circuit 23 to the chamber 14d of the 3-2 timing valve 14 through the oil conduit 66 can not hold the valve spool 14b upwardly to the position indicated by the left half thereof against the force of the spring 14c so that the valve spool 14b is allowed to move downwardly into the position indicated by the right half of the spool, thereby providing communication between the oil conduits 65 and 67. In this instance, the servo release pressure is discharged through the oil conduit 67, the 3-2 timing valve 14, the oil conduit 65 and the drain port 13e at a rate which is comparatively higher than the rate achieved when the vehicle speed is relatively high as previously described. In this manner, the servo release pressure is discharged, when compared with the discharge rate of the front clutch pressure, at a relatively low rate determined by the flow rate of oil through the orifice 69 under high vehicle speed conditions and at a relatively high rate when the vehicle speed is relatively low. For these reasons, the actuation of the servo motor 106' to apply the second brake 106 is retarded at high vehicle speeds as compared with the timing at which the front clutch 104 is uncoupled, thereby making it possible to achieve a prolonged neutral interval during which the engine is enabled to increase its revolution speed to a value to match the vehicle speed while a downshift is being made from the third gear ratio to the second gear ratio without producing a gear shift shock. At low vehicle speeds, the amount of retardation in the application of the second brake 106 as compared with the timing at which the front clutch 104 is to be uncoupled is reduced so that the amount of retardation provides the period of time which is required for the engines to increase its speed to a level to match the vehicle speed, thereby making it possible to reduce the gear shift shock produced during the above described downshift.

It may be mentioned that, when the vehicle speed and accordingly the governor pressure developed in the chamber 5d decreases, the 3-2 downshift valve 5 performs a function similar to that which the valve 5 does in response to an increase in the throttle valve opening degree as above described, enabling the automatic transmission mechanism to make a downshift from the third gear ratio to the second gear ratio.

As the vehicle speed further decreases, the governor pressure in the chamber 3e of the 1-2 shift valve 3 becomes no longer capable of overcoming the force of the spring 3d so that the spring causes the valve spools 3b and 3c to move downwardly from the positions indicated by the left halves to the positions indicated by the right halves in the drawing, thereby isolating the oil conduits 31 from the oil conduit 30 and permitting the oil conduit 31 to communicate with the drain port 3t. As a consequence, the line pressure which has been fed to the servo apply chamber 106'a is passed through the check valve 76 in the oil conduit 42 and is discharged through the oil conduit 31 and the drain port 3t, thereby causing the band servo motor 106' to release the second brake 106. Among the friction units, only the rear clutch 105 is now held in the operative state so that a downshift is effected from the second gear ratio to the first gear ratio in the automatic transmission.

When the spool 2f of the manual valve 2 is thereafter urged to move back to N range position, the port 2b is drained off so that the line pressure which has been passed to the rear clutch 105 is discharged through the oil conduit 29, the check valve 77 and the oil conduit 22 and further by way of the port 2b of the manual valve 2 and renders all the friction units of the automatic transmission inoperative, producing a neutral condition in which the transmission of power is interrupted.

When the accelerator pedal is fully depressed to produce a kickdown condition while the vehicle is moving with the above described third gear ratio, the plunger 8d of the throttle valve 8 moves into the rightward limit position thereof as previously described so that a kickdown pressure (line pressure) is developed in the kickdown pressure circuit 24. The kickdown pressure thus developed is directed on one hand to the port 3u of the 1-2 shift valve 3 and on the other hand to the chamber 4p of the 2-3 shift valve 4 through the oil conduit 37. The kickdown pressure indicated into the chamber 4p acts on the upper and lower pressure acting faces of the land 4g and the upper pressure acting face of the land 4h of the valve spool 4b held in the position indicated by the left half of the spool and, in cooperation with the spring 4d, causes the valve spools 4b and 4c to move downwardly into the positions indicated by the right halves thereof. As a consequence, the 2-3 shift valve 4 effects a downshift from the third gear ratio to the second gear ratio in the automatic transmission in a manner similar to that which has geen described. If the vehicle speed further decreases, the kickdown pressure which is fed from the circuit 24 to the port 3u of the 1-2 shift valve 3 acts on the upper pressure acting face of the land 3h, the upper and lower pressure acting faces of the land 3g and the lower pressure acting face of the land 3f and, in cooperation with the spring 3d, causes the valve spools 3b and 3c to move downwardly from the positions indicated by the left halves to the positions indicated by the right halves of the spools. As a consequence, the 1-2 shift valve 3 effects a downshift from the second gear ratio to the first gear ratio in a manner similar to that which has been described.

When a kickdown condition is produced while the vehicle is moving with the first gear ratio, the line pressure appearing in the gear shift control pressure circuit 25 as above described acts on the differential area between the lands 3m and 3n of the valve spool 3c held in the position indicated by the right half of the spool in the 1-2 shift valve 3 and further on the differential area between the lands 4h and 4i of the valve spool 4b held in the position indicated by the right half of the spool in the 2-3 shift valve 4, thereby urging each of these valve spools to move downwardly in the drawing. Furthermore, the kickdown pressure developed in the kickdown pressure circuit 24 acts on the differential area between the lands 3g and 3h of the valve spool 3b in the position indicated by the right half of the spool in the 1-2 shift valve 3 and furtheron the land 4g of the valve spool 4b in the position indicated by the right half of the spool in the 2-3 shift valve 4, thereby urging these valve spools downwardly. Furthermore, the shift valves 3 and 4 are subjected to the downward forces which are exerted by the springs 3d and 4d, respectively. The above described downward forces thus exerted on the spools of the shift valves 3 and 4 are opposed by the forces resulting from the governor pressure developed in the chambers 3e and 4e so that, when the vehicle speed becomes such that the governor pressure resulting therefrom overcomes the downward forces exerted on the valve spool of the 1-2 shift valve, then the 1-2 shift valve 3 effects an upshift from the first gear ratio to the second gear ratio in the manners previously described and, when the vehicle speed becomes such that the governor pressure resulting therefrom overcomes the downward force exerted on the valve spool of the 2-3 shift valve 4, then the 2-3 shift valve 4 effects an upshift from the second gear ratio to the third gear ratio in the manners previously described. Since, however, the downward forces exerted on the valve spools of shift valves 3 and 4 are larger than the downward forces which are exerted thereon under ordinary throttle valve opening degree conditions, an upshift can not be effected and accordingly acceleration can be achieved by a large driving power with a low gear ratio until the vehicle speed is increased beyond levels which are higher than the corresponding levels at which an upshift takes place in the ordinary throttle valve opening degrees.

The operation to be achieved when II range is selected when the vehicle is running with the third gear ratio with the manual valve 2 set in D range will be explained now. During conditions in which the third gear ratio in D range is in play, the line pressure directed to the oil conduit 40 is passed through the groove 6e and the oil passage 6g to the chamber 6f and causes the valve spool 6b to move from the position indicated by the upper half to the position indicated by the lower half thereof against the force of the spring 6c, whereupon the valve spool is maintained in the latter position by the line pressure which is directed from the oil conduit 31 to the chambr 6f by way of the groove 6e and the oil passage 6g. When the manual valve 2 is moved to the II range position thereof under these conditions, the line pressure circuit 16 is permitted to open to the ports 2b and 2c so that the line pressure is directed through the port 2b to the same places as those previously described and from the port 2c is directed to the oil conduit 45 as a II range back-up pressure. Since, upon this manipulation of the manual valve 2, its port 2e is drained off, the supply of pressure to the front clutch 104 and servo release chamber 106b' which has been effected in the third gear ratio now terminates and the pressure begins to be discharged via the check valve 34 swiftly, causing a shift down from the third gear ratio to the second gear ratio, and furthermore, even if, in the II range, the spool 4c can not remain in the above mentioned downward position thereof owing to an increase in the urging force resulting from an increase in the vehicle speed, an upshift to the third gear ratio will not take place because there is no third gear ratio pressure in the oil conduit 35. The line pressure directed into the oil conduit 45 is passed through the oil conduit 43 and the shuttle valve 46 to the port 7h of the pressure modifier valve 7 with the line pressure booster valve 6 held under the above described condition. The pressure modifier valve 7 is thus operative to deliver to the oil conduit 54 the modifier pressure with its maximum value irrespective of the variation in the throttle valve opening degree by reason of the previously described pressure modifying function of the valve, the modifier pressure being fed to the pressure regulator valve 1. As a consequence, the pressure regulator valve 1 enabled, by reason of the previously described operational functions thereof, to develop in the line pressure circuit 16 line pressure having its maximum value irrespective of the variation in the throttle valve opening degree. For this reason, a sufficiently high line pressure can be produced and accordingly the rear clutch 105 and the band servo 106' are actuated powerfully at low to medium throttle valve opening degrees, thereby ensuring sufficient engine braking effect under the II range condition.

When the vehicle speed decreases to a certain value while the vehicle is running under the II range condition, the valve spool 3b of the 1-2 shift valve 3 moves downwardly from the upshift position indicated by the left half to the downshift position indicated by the right half of the spool under the influence of the spring 3d with the result that a downshift is effected from the second gear ratio to the first gear ratio in the automatic transmission in a manner similar to that previously described. Under this condition, the oil pressure which has been developed in the oil conduit 31 is eliminated and, as a consequence, the valve spool 6b of the line pressure booster valve 6 is liberated from a force holding the valve spool 6b in the righthand position indicated by the lower half of the spool and is therefore urged to move back into the position indicated by the upper half of the spool by the force of the spring 6c. As a result, the line pressure in the oil conduit 45 is prevented from extending beyond the line pressure booster valve 6 and the oil conduit 43 is permitted to communicate through the oil conduits 44 and 47 with the drain port 9c of the throttle failsafe valve 9. To the port 7h of the pressure modifier valve 7 is thus supplied the throttle pressure from the throttle pressure circuit 48 via the shuttle valve 46, thereby enabling the pressure modifier valve 7 to control the pressure regulator valve 1 so that the pressure regulator valve 1 develops unboosted line pressure in the line pressure circuit 16.

As the vehicle speed increases thereafter and as a consequence the governor pressure developed in the chamber 3e of the 1-2 shift valve 3 urges the shift valve 3 into the upshift state thereof, an upshift is made from the first gear ratio to the second gear ratio in the manner previously described. Although the line pressure developed in the oil conduit 31 is directed to the line pressure booster valve 6 under this condition, since the valve spool 6b of the valve 6 is held in the position indicted by the upper half of the spool, it does not move rightwardly. Accordingly, the line pressure is boosted upto its maximum magnitude in response to downshift to the second gear ratio from the third gear ratio as a result of setting the manual valve 2 from D range to II range or I range. This provides a sufficiently high force to the servo motor 106' for the second brake 106 to apply the second brake 106 with a force sufficiently high enough to ensure engine braking effect. Once the first gear ratio is achieved, however, the line pressure shall not be boosted and accordingly the gear shift shock is not amplified even if an upshift from the first gear ratio to the second gear ratio and a downshift from the second gear ratio to the first gear ratio are repeated alternately. Where a shift is made from the second gear ratio in D range to the second gear ratio in II range or that in I range, the second brake 106 is kept applied to the grasp the drum 126 (see FIG. 1) so that the brake necessary for engine braking upon setting the manual valve 2 to II range from D range under third gear ratio condition. Therefore, the line pressure need not be augmented by the line pressure booster valve 6.

When the manual valve 2 is set to I range, the line pressure circuit 16 is permitted to communicate not only with the ports 2b and 2c, but also with the port 2d. The line pressure passed through the ports 2b and 2c is directed to the same places as those previously described and the line pressure passed through the port 2d is supplied to the manual first range pressure reducing valve 11 as a I range pressure. There being initially no oil pressure in the chamber 11d of the pressure reducing valve 11, the valve spool 11b is maintained in the lower position indicated by the right half of the spool 11b by the force of the spring 11c. When, however, the line pressure directed from the oil conduit 59 is passed to the chamber 11d and causes the valve spool 11b to move upwardly so that the line pressure is partially discharged through the drain port 11f, the valve spool 11b assumes a balanced position indicated by the left half of the spool, thereby reducing the line pressure to a magnitude equal to the force of the spring 11c acting on the valve spool 11b in the balanced position. The line pressure directed to the oil conduit 59 is therefore reduced to a constant value and the reduced pressure thus obtained is passed through the oil conduit 58, the shuttle valve 28 and the oil conduit 26 and acts on the land 31 of the spool of the 1-2 shift valve 3, exerting a downward force on the valve spool 3c. At vehicle speed at which the downward force is smaller than the upward force resulting from the governor pressure developed in the chamber 3e, the valve spools 3b and 3c are held in the upshift positions indicated by the respective left halves of the spools and keep the automatic transmission in the second gear ratio, thereby preventing the engine from overrunning which would otherwise be caused if a downshift to the first gear ratio is made right after the manual valve 2 has been set to I range while the vehicle is moving at a high speed. In this case, the line pressure is augmented by the line pressure booster valve 6 to ensure effective engine braking in the same manner as previously described in connection with the operation under II range condition when the second gear ratio is established as a result of selecting I range when the vehicle is moving with the third gear ratio. The line pressure in this case is directed from the port 2c as I range pressure through the oil conduit 45 to the line pressure booster valve 6. As the vehicle speed decreases and as a consequence the upward force resulting from the governor pressure developed in the chamber 3e decreases, the valve spool 3c moves downwardly into the position indicated by the right half of the spool in the drawing by the downward force resulting from the previously mentioned constant reduced pressure acting on the land 31 of the valve spool 3c, while, the valve spool 3b is held in the position indicated by the left half thereof and spaced apart from the valve spool 3c by the above mentioned constant reduced oil pressure with the spring 3d in a compressed state. Under this condition, the oil conduit 27 which has been open to the drain port 3s is permitted to communicate with the oil conduit 26 and allows the constant reduced oil pressure in the oil conduit 26 to be directed through the oil conduit 27 to the low-and-reverse brake 107 so that the automatic transmission is enabled to drive the vehicle under I range condition while producing an engine braking effect by means of the low-and-reverse brake 107 thus applied and the rear clutch 105 which is maintained coupled. The manual first range pressure reducing valve 11 is adapted to reduce the line pressure from the oil conduit 59 to a constant valve dictated by the force of the spring 11c and delivers the reduced oil pressure to the oil conduit 58 so that the shift point for the 1-2 shift valve 3 can be selected to occur at a desired constant vehicle speed under manual first range (I range) condition for thereby preventing, without any delay, the engine from overrunning over the whole throttle valve opening degree range.

When the manual valve 2 is set from N range to R range, the line pressure circuit 16 is permitted to communicate with the outlet ports 2a and 2e. From the outlet port 2a, the line pressure is passed through the oil conduit 60 as a reverse pressure and is directed on one hand through the shuttle valve 28 and the oil conduit 26 to the 1-2 shift valve 3 and further through the oil conduit 27 to the low-and-reverse brake 107 with the valve spools 3b and 3c held in the positions indicated by the right halves thereof in the absence, in the chamber 3e, of governor pressure, and on the other hand through the orifice 78, shuttle valve 61 and oil conduit 62 to the front clutch 104. The line pressure to be passed to the front clutch 104 is restricted by the orifice 78 on its way to the front clutch 104 so that the oil pressure to be developed in the front clutch 104 increases initially at a low rate and thereafter at a gradually increasing rate. The oil pressure to be supplied to the front clutch 104 is also directed through a branch conduit from the oil conduit 60 to the chamber 12a of the accumulator 12 and causes the stepped piston 12b to move downwardly against the force of the spring 12f. As a consequence, the oil conduit supplied to the front clutch 104 increases slowly and accordingly the front clutch 104 is caused to couple slowly without producing shock which would otherwise be caused when the manual valve 2 is set from N range to R range. The automatic transmission is thus made operative to drive the vehicle rearwardly with the front clutch 104 coupled and the low-and-reverse brake 107 applied.

When the manual valve 2 is set to N range, the outlet port 2a is permitted to communicate with the drain opening so that the line pressure in the front clutch 104 is discharged quickly through the oil conduit 62, the shuttle valve 61, the oil conduit 60, the check valve 79 and the port 2a of the manual valve 2 while the line pressure in the low-and-reverse brake 107 is discharged quickly by way of the oil conduit 27, the shuttle valve 28, the oil conduit 60 and the port 2a of the manual valve 2, thereby rendering the automatic transmission into the neutral condition thereof.

The following description concentrates on how the hydraulic control system according to the present invention prevents the occurrence of an interlock in the change-speed gearbox (see FIG. 1) of the automatic transmission.

Consider a case where the valve spools 4b and 4c of the 2-3 shift valve 4 are sticked to the upshift state when the valve spools 3b and 3c of the 1-2 shift valve 3 are in the downshift state. If, in this case, the manual valve 2 is set to D range, the outlet port 2d of the manual valve 2 is drained off and thus no I range pressure appears from the port 2d, with the result that the low-and-reverse brake 107 is prevented from being applied although the front clutch 104 is coupled and second brake 106 is released owing to the upshift state of the 2-3 shift valve 4. Therefore, what happens in this case is the engagement of the rear clutch 105 and that of the front clutch 104 to establish the third gear ratio.

If, in the above-mentioned case, the manual valve 2 is set to II range, since the outlet port 2d is drained off and thus no I range pressure appears from the outlet port 2d, the low-and-reverse brake 107 is prevented from being applied. In this case, since the outlet port 2e is drained off, too, the engagement of the front clutch 104 and the release of the second brake 106 are prevented from taking place. Since the port 2e and port 2d are drained off when the manual valve 2 is in II range, what is allowed to occur as a result of any one of possible combinations of upshift state or downshift state of 1-2 shift valve 3 with that of the 2-3 shift valve 4 is the engagement of the rear clutch 105 and/or the application of the second brake 106. Therefore, the interlock will not take place when the manual valve 2 is set to II range.

If, in the before-mentioned case, the manual valve 2 is set to I range, the second gear ratio is established in order to prevent overun of the engine or once the vehicle speed has dropped sufficiently, the first gear ratio is established and held by actuating the rear clutch 105 and the low and reverse brake 107, wherein the change over between these two gear ratio states is carried out by the 1-2 shift valve 3 so that there is no possibility that both the second brake 106 and the low and reverse brake are actuated at the same time even if the valve spools 3b and 3c of the 1-2 shift valve 3 are sticked to upshift or downshift state. Therefore the transmission is prevented from being interlocked by simultaneous engagement of the three friction elements, viz., the rear clutch 105, second brake 106 and low-and-reverse brake 107. Furthermore, in this I range state, since the outlet port 2e of the manual valve 2 is drained off so that there is no supply of II range pressure to the 2-3 shift valve 4, there occurs no possibility that the front clutch 104 is engaged even if the 2-3 shift valve 4 is sticked to upshift or downshift state.

If the manual valve 2 is set to R range, since the outlet port 2b is drained off, the rear clutch 105 will not be engaged and since no line pressure is directed to the 1-2 shift valve 3 from the outlet port 2b, the second brake 106 will not be engaged. Therefore, the transmission is prevented from being interlocked because in the R range no friction element except the front clutch 104 and low and reverse brake 107 is engaged.

What is claimed is:

1. A hydraulic control system for an automatic transmission including a first friction unit to be engaged for all of forward drive ranges, a second friction unit, and a third friction unit, comprising:

a pressure regulator valve for producing a line pressure in a fluid conduit;

a manual valve;

said manual valve including a housing having a wall defining a bore and a spool slideably disposed within said bore for movement to a parking range, a reverse range, a neutral range, an automatic drive range, a manual second range and a manual first range;

said housing being formed with an inlet port connected to said pressure regulator valve through said fluid conduit, a first outlet port which is allowed to communicate with said inlet port when said spool is set to said reverse range and which is connected to said third friction unit, a second outlet port, a third outlet port which is allowed to communicate with said inlet port to receive the line pressure when said spool is set to one of said automatic drive range, said manual second range or said manual first range, a fourth outlet port which is allowed to communicate with said inlet port to receive the line pressure when said spool is set to one of said manual second range or said manuel first range, and a fifth outlet port which is allowed to communicate with said inlet port when said spool is set to said manual first range;

a first shift valve for effecting a shift between one gear ratio and another gear ratio, said first shift valve having an inlet port connected to said third outlet port, an outlet port connected to said second friction unit and a drain port, said first shift valve being shiftable between a downshift state wherein said outlet port thereof is isolated from said inlet port thereof and is allowed to communicate with said drain port and an upshift state wherein said outlet port thereof is allowed to communicate with said inlet port thereof and is isolated from said drain port thereof;

a second shift valve for effecting a shift between said another gear ratio and still another gear ratio, said second shift valve having an inlet port, an outlet port connected to said third friction unit, and a drain port, said second shift valve being shiftable between a downshift state wherein said outlet port thereof is isolated from said inlet port thereof and is allowed to communicate with said drain port, and an upshift state wherein said outlet port is allowed to communicate with said inlet port and is isolated from said drain port, said second outlet port of said manual valve being allowed to communicate with said inlet port when said spool is set to one of said automatic drive range, said neutral range and said reverse range, but being drained when the spool is set to said parking range, said manual second range and said manual first range, said second outlet port being connected to said inlet port of said second shift valve.

2. A hydraulic control system as claimed in claim 1, wherein said first outlet port, said second outlet port, said inlet port of said manual valve, said third outlet port, said fourth outlet port, and said fifth outlet port are open to said bore and arranged within said wall in this order along the axial direction of said bore, and wherein said spool is formed with axially spaced first land and second land.

3. A hydraulic control system as claimed in claim 2, wherein all of said outlet ports of said manual valve are isolated from said inlet port of said manual valve when said spool is set to said parking range, said first and second outlet ports are allowed to communicate with said inlet port of said manual valve when said spool is set to said reverse range, said second outlet port is allowed to communicate with said inlet port of said manual valve when said spool is set to said neutral range, said second and third outlet ports are allowed to communicate with said inlet port of said manual valve when said spool is set to said automatic drive range, said third and fourth outlet ports are allowed to communicate with said inlet port of said manual valve when said spool is set to said manual second range, and said third, fourth and fifth outlet ports are allowed to communicate with said inlet port of said manual valve when said spool is set to said manual first range.

4. A hydraulic control system as claimed in claim 2, wherein said first land is slideable on a first area of said wall when said spool is urged to move between said parking range and said manual first range, and said second land is slideable on a second area of said wall when said spool is urged to move between said parking range and said manual first range, and wherein said first and second outlet ports are disposed within said second area of said wall means and adapted to be covered by said second land, and said inlet port of said manual valve and said third, fourth and fifth outlet ports are disposed within said first area and adapted to be covered by said first land.

5. A hydraulic control system as claimed in claim 3 or 4, wherein said first and second outlet ports are isolated from said inlet port of said manual valve when said spool is set to one of said parking range, said manual second range and said manual first range, and wherein said third, fourth and fifth outlet ports are isolated from said inlet port of said manual valve when said spool is set to one of said parking range, said reverse range and said neutral range.

6. A hydraulic control system as claimed in claim 5, wherein said bore has a first end opening on that end thereof which is near said first outlet port and a second end opening on that other end thereof which is near said fourth outlet port, wherein said housing is formed with a drain port between said first end opening and said first outlet port, and wherein said first land covers said inlet port of said manual valve and uncovers said third, fourth and fifth outlet ports when said spool is set to said parking range and said second land is disposed between said first end opening and said drain port.

* * * * *